(12) United States Patent
Leonard et al.

(10) Patent No.: US 7,034,272 B1
(45) Date of Patent: Apr. 25, 2006

(54) METHOD AND APPARATUS FOR EVALUATING INTEGRATED CIRCUIT PACKAGES HAVING THREE DIMENSIONAL FEATURES

(75) Inventors: Patrick F. Leonard, Ann Arbor, MI (US); Victor Scarpine, Ann Arbor, MI (US); Frank Evans, Dundee, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 578 days.

(21) Appl. No.: 09/680,342

(22) Filed: Oct. 5, 2000

Related U.S. Application Data

(60) Provisional application No. 60/157,763, filed on Oct. 5, 1999.

(51) Int. Cl.
*G06K 9/00* (2006.01)
*G01N 21/00* (2006.01)

(52) U.S. Cl. .................................. 250/208.1; 382/149

(58) Field of Classification Search ........... 250/559.06, 250/559.05, 559.07, 559.08, 559.45, 559.46, 250/559.48, 208.1; 356/602, 606, 607, 608, 356/237.4, 237.5; 382/145–151
See application file for complete search history.

(56) References Cited

U.S. PATENT DOCUMENTS

| | | | |
|---|---|---|---|
| 4,188,544 A | 2/1980 | Chasson ................ 250/559.06 |
| 4,335,962 A | 6/1982 | DiMatteo et al. ........... 356/604 |
| 4,529,316 A | 7/1985 | DiMatteo .................... 356/602 |
| 4,594,001 A | 6/1986 | DiMatteo et al. ........... 356/608 |
| 4,682,894 A | 7/1987 | Schmidt et al. ............. 356/614 |
| 4,684,991 A | 8/1987 | Forchheimer et al. ...... 348/309 |
| 4,701,047 A | 10/1987 | Eibert et al. ............... 356/3.07 |
| 4,731,853 A | 3/1988 | Hata et al. .................. 382/153 |
| 4,736,108 A | 4/1988 | Comstock et al. ..... 250/559.34 |
| 4,739,175 A | 4/1988 | Tamura .................. 250/559.34 |
| 4,758,093 A | 7/1988 | Stern et al. .................. 356/608 |
| 4,801,207 A * | 1/1989 | Williams .................... 356/606 |
| 4,895,434 A | 1/1990 | Stern et al. ................. 359/196 |
| 4,925,308 A | 5/1990 | Stern et al. ................. 356/614 |
| 4,929,843 A | 5/1990 | Chmielewski et al. . 250/559.05 |
| 4,979,815 A | 12/1990 | Tsikos ........................ 356/3.06 |
| 5,024,529 A | 6/1991 | Svetkoff et al. ............ 356/608 |
| 5,028,799 A * | 7/1991 | Chen et al. ............ 250/559.23 |
| 5,118,192 A | 6/1992 | Chen et al. .................. 356/602 |
| 5,162,866 A | 11/1992 | Tomiya et al. ........... 356/237.1 |
| 5,305,895 A | 4/1994 | Hermann .................... 209/586 |
| 5,371,375 A | 12/1994 | Stern et al. ............. 250/559.23 |

(Continued)

OTHER PUBLICATIONS

Mengel et al., Translation of EP 0 471 196 A2, "Method of Image Analysis", Feb. 19, 1992.*

*Primary Examiner*—Edward J. Glick
*Assistant Examiner*—Chih-Cheng Glen Kao
(74) *Attorney, Agent, or Firm*—Young & Basile, P.C.

(57) ABSTRACT

The present invention provides for methods and an apparatus for evaluating objects having three dimensional features. One method involves using both two dimensional data sets to improve the processing of three dimensional data sets. The two dimensional data set can be used to pre-qualify the three dimensional data set, or may be used to locate that data within the three dimensional data set that is characteristic of the three dimensional feature. The invention may include a sensor configured to capture both three dimensional and two dimensional data. The present invention provides for an efficient technique to evaluate three dimensional data. The present invention also solves heretofore unrecognized problems associated with geometric distortion.

25 Claims, 14 Drawing Sheets

U.S. PATENT DOCUMENTS

| | | | |
|---|---|---|---|
| 5,402,505 A * | 3/1995 | Roy et al. | 382/145 |
| 5,463,227 A | 10/1995 | Stern et al. | 250/559.23 |
| 5,465,152 A | 11/1995 | Bilodeau et al. | 356/602 |
| 5,546,189 A | 8/1996 | Svetkoff et al. | 356/602 |
| 5,600,150 A | 2/1997 | Stern et al. | 250/559.23 |
| 5,617,209 A | 4/1997 | Svetkoff et al. | 356/608 |
| 5,640,200 A * | 6/1997 | Michael | 382/151 |
| 5,652,658 A * | 7/1997 | Jackson et al. | 356/398 |
| 5,654,800 A | 8/1997 | Svetkoff et al. | 356/602 |
| 5,668,630 A | 9/1997 | Bilodeau et al. | 356/237.5 |
| 5,691,544 A | 11/1997 | Stern et al. | 250/559.29 |
| 5,691,810 A | 11/1997 | Bilodeau et al. | 356/237.1 |
| 5,793,051 A | 8/1998 | Stern et al. | 250/559.2 |
| 5,815,275 A | 9/1998 | Svetkoff et al. | 356/608 |
| 5,822,468 A | 10/1998 | Forchheimer et al. | 382/321 |
| 5,956,134 A * | 9/1999 | Roy et al. | 356/237.5 |
| 5,978,080 A * | 11/1999 | Michael et al. | 356/243.1 |
| 6,055,328 A * | 4/2000 | Li | 382/145 |
| 6,118,538 A * | 9/2000 | Haugan et al. | 356/623 |
| 6,173,070 B1 * | 1/2001 | Michael et al. | 382/145 |
| 6,177,682 B1 * | 1/2001 | Bartulovic et al. | 382/150 |
| 6,522,777 B1 * | 2/2003 | Paulsen et al. | 382/147 |

* cited by examiner

COLLECTION OF PROFILES

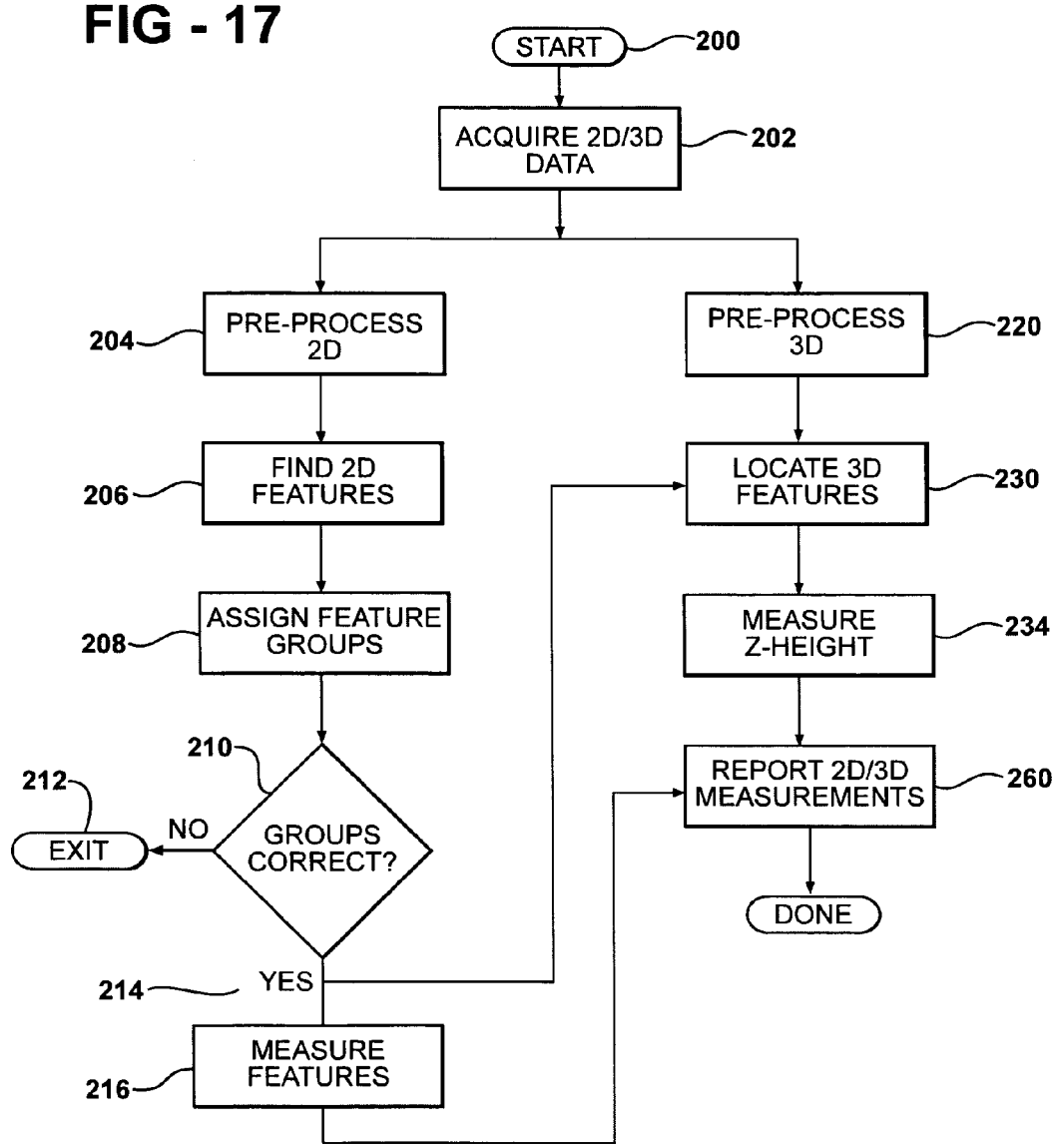

METHOD AND APPARATUS FOR EVALUATING INTEGRATED CIRCUIT PACKAGES HAVING THREE DIMENSIONAL FEATURES

CLAIMING PRIORITY

Under the provisions of 35 U.S.C. 119(e) and Patent Rule 55, Applicant claims the benefit of prior provisional Application No. 60/157,763 filed Oct. 5, 1999.

FIELD OF THE INVENTION

This invention relates to three dimensional sensing systems and methods for acquiring and evaluating images including data characteristic of three dimensional features on an object.

BACKGROUND OF THE INVENTION

As integrated circuit packages increase in capability and complexity, the number of wires or contacts needed to interconnect the IC package to its associated substrate increases. Two of the methods used to increase the number of interconnects are to decrease the size and increase the density of wires around the sides of the IC package or form a two dimensional array of interconnects, or balls, on the underside of the IC package. Examples of these types of IC packages are the quad flat pack (QFP), which can have up to 600 wires on four sides of an IC package, or the ball grid array (BGA), which can have over 1000 solder balls that form interconnects on the bottom of the IC package. The wires or leads of a QFP and the balls of a BGA are three dimensional features. That is, the balls and wires of the various packages project away from the package.

The substrate or wafer to which the QFP or BGA attaches includes a corresponding array of pads to which the wires ("leads") of the QFP or balls of the BGA mate. It is of critical importance in the manufacture of electronics that the individual leads or balls are coplanar with one another. If the leads or balls are not coplanar, and the IC package is soldered onto a substrate, some of the leads or balls may be in electrical contact with the substrate while others will not be. The connections between a BGA and its substrate are not subject to visual inspection. Further, once a BGA is in place it is often easier to discard the entire substrate with BGA if the BGA is faulty. That is, if a single IC package on a substrate that potentially contains numerous IC packages is not fully connected, then the entire substrate is defective and must either be repaired or discarded.

The critical nature of attaching IC packages such as QFPs or BGAs to their substrates to have connectivity has created a need to measure the coplanarity of QFPs and BGAs. In the prior art, coplanarity is often measured using a laser and a complementary metal-oxide semiconductor (CMOS) or CCD camera connected to a computer via a framegrabber. This is an extremely slow process. To facilitate increased speed of the process the prior art has proposed alternate conveyor mechanisms to convey the part in the field of view of the camera in a more expeditious manner.

The operation and application of 3-D sensors is known in the art as exemplified by U.S. Pat. Nos. 4,238,147, 4,590,367 and 5,028,799. The plane of light may be formed by a collimated laser beam spread by a cylindrical lens or by a spot of light that is deflected by a mirror mounted on a galvanometer, mechanical motion, spinning mirror, or acousto-optic deflector to form an equivalent plane made of a group of spots. The surface depth information is obtained by reading a signal for each part of the plane from a position sensor.

Despite the solutions proposed by the prior art a significant need exists to provide a higher speed product to measure coplanarity.

SUMMARY OF THE INVENTION

The present invention provides for both methods and apparatus relating to evaluating objects having three-dimensional features.

A first aspect of the present invention provides for a method for locating three dimensional data in a three dimensional data set characteristic of an object wherein the three dimensional data is characteristic of a three dimensional feature in the object. The method includes acquiring a two-dimensional data set characteristic of the object wherein said two dimensional data set includes a plurality of values, each value including an address and locating those values in the two dimensional data set which are characteristic of the three dimensional feature in the object. A three-dimensional data set is also acquired which is characteristic of the object wherein the three-dimensional data set includes a plurality of values, each value including an address. Values and addresses are selected from the three dimensional data set which are characteristic of the three dimensional feature as a function of the location of the data in the two dimensional data set which is characteristic of the three dimensional feature.

According the preferred embodiment the function used to locate the three dimensional data characteristic of the three dimensional feature is an empirical relationship defined through a calibration process using a golden part.

A second aspect of the present invention involves evaluating the quality of an IC package where said IC package includes a plurality of three dimensional features. The method of the second aspect of the present invention includes acquiring a two dimensional image characteristic of at least three of the three dimensional features on the IC package and acquiring a three dimensional image of at least three of the three dimensional features on the IC package. A two dimensional template representing the expected configuration of the three dimensional features on the IC package is provided. The two dimensional image is compared against the two dimensional template and the quality of the semiconductor is rejected if the comparison reveals that the two dimensional image does not include three dimensional data of the expected configuration.

A third aspect of the present invention is directed toward a sensor for acquiring data from an object including three dimensional features. The sensor preferably includes a CMOS device including plurality of pixels arranged in rows and columns, each column of pixels including an associated analog to digital converter and each column including an associated processor. According to the third aspect of the present invention at least one of said processors associated with at least one of said columns is configured to acquire two dimensional data and said remaining columns are configured to acquire three dimensional data.

BRIEF DESCRIPTION OF THE FIGURES

FIG. 15' is an illustration of a golden part.

FIG. 17 is a flow chart according to an embodiment of the present invention in which 2D and 3D data are processed.

DETAILED DESCRIPTION OF THE PREFERRED EMBODIMENT

The present invention provides an apparatus and method for determining the co-planarity of objects having three dimensional features, and in particular an integrated circuit package (IC package). In its preferred embodiment the invention provides an apparatus and method for determining the co-planarity of three dimensional features on an IC package. The present invention increases processing speed and throughput for the inspection of IC packages. In its preferred embodiment the present invention utilizes a CCD sensor, which includes individual analog to digital converters and individual processors associated with each column of the CMOS sensor. The CMOS sensor is preferably configured to acquire both two dimensional and three dimensional images of an IC package. As used herein the difference between a two dimensional and a three dimensional image is that a three dimensional image is made up of a data set which includes data points defined by an address having three components, x, y, and z wherein a two dimensional image is made up of a data set defined by data points defined by an address having two components, x, and y. Viewed in terms of the present system a three dimensional data set includes a height or z axis component, while a two dimensional data set represents the appearance of an object as viewed from above.

According to one aspect of the present invention, the two dimensional images acquired by the sensor may be used to pre-qualify the validity of the three dimensional images or data acquired and to potentially eliminate the need to evaluate the three dimensional data. An example of this is that in inspecting an IC package it is known beforehand the number and location of the three dimensional features to be inspected. Acquisition of two dimensional images including two dimensional data characteristic of three dimensional features in the object allows the system to confirm whether the number of features and their location on the IC package are proper. If they are not proper the system can reject the part. If they are proper the system can continue to evaluate the specific attributes of the three dimensional features.

The present invention recognizes a problem in three dimensional vision not heretofore recognized, namely problems associated with geometric distortion. The present invention provides numerous techniques to solve geometric distortion. The preferred method according to this aspect of the invention uses the two dimensional data to properly locate where in the three dimensional data actual three dimensional features are presented. These and other aspects of the present invention are described in more detail with reference to the figures in which like elements are numbered alike.

Figure 1:
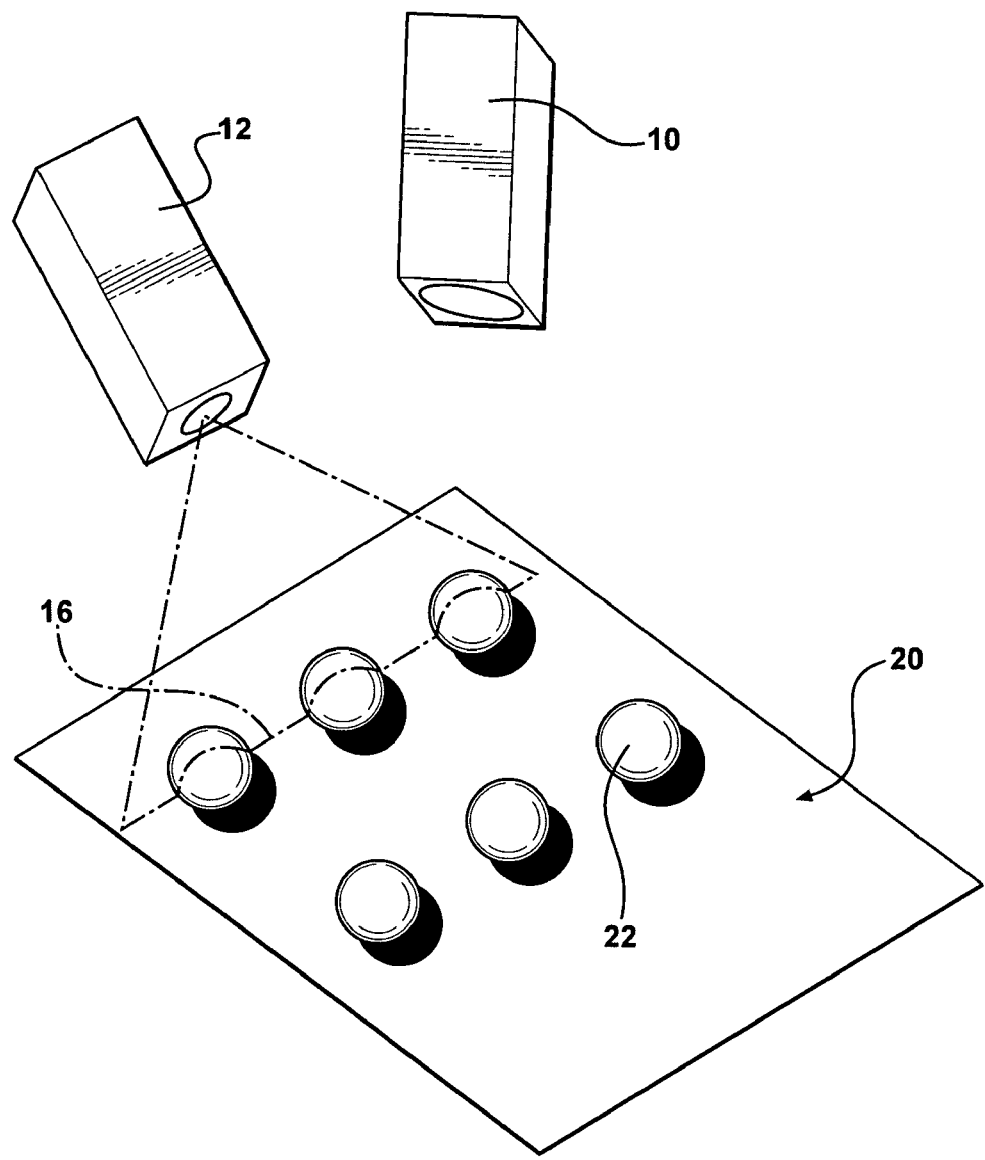
FIG. 1 is a schematic illustration of a three-dimensional vision system of the present invention including a linear line laser, a sensor/processor and an integrated circuit package including a ball grid array according to the first embodiment of the present invention.
Figure 2:
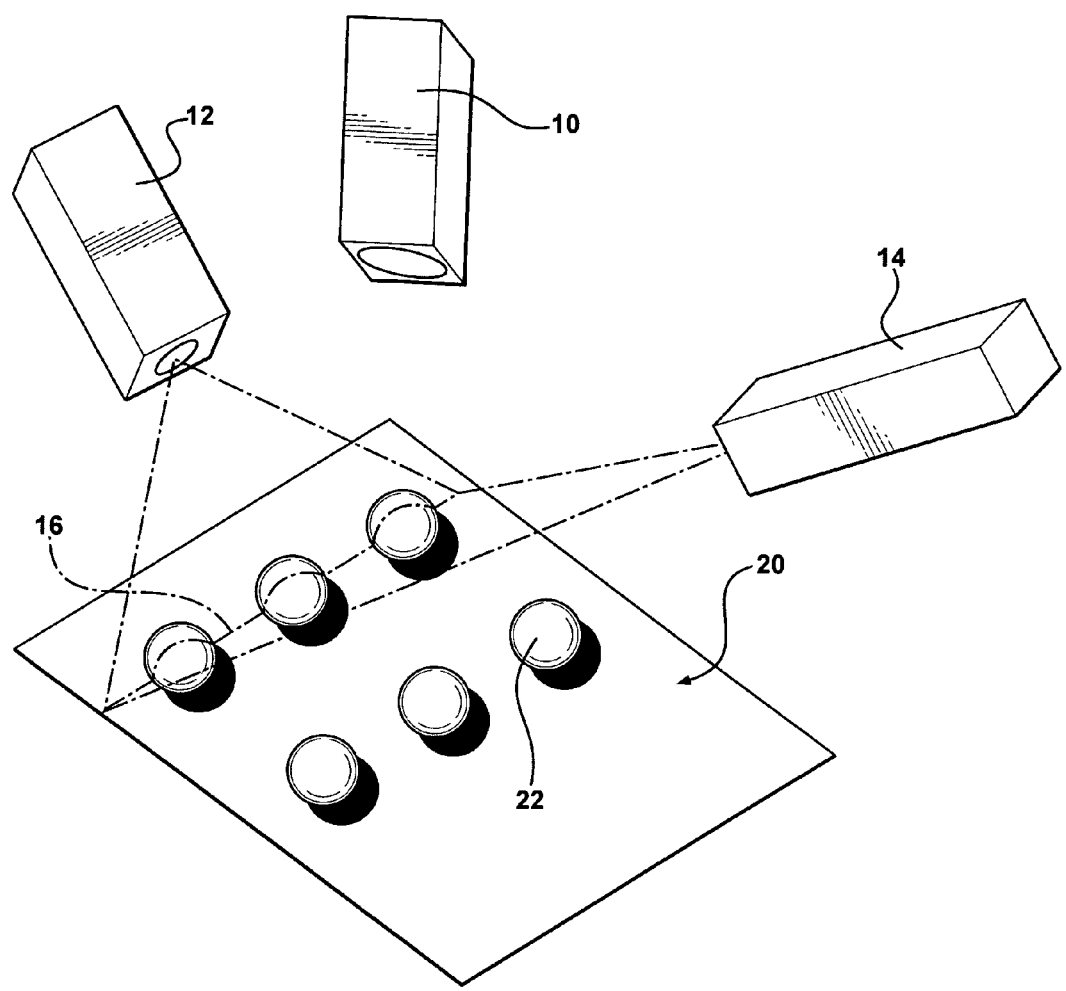
FIG. 2 is a schematic representation of the second preferred embodiment of the present invention including two linear line lasers positioned at different offset angles from a sensor/processor and an integrated circuit package including a ball grid array.
Figure 3:
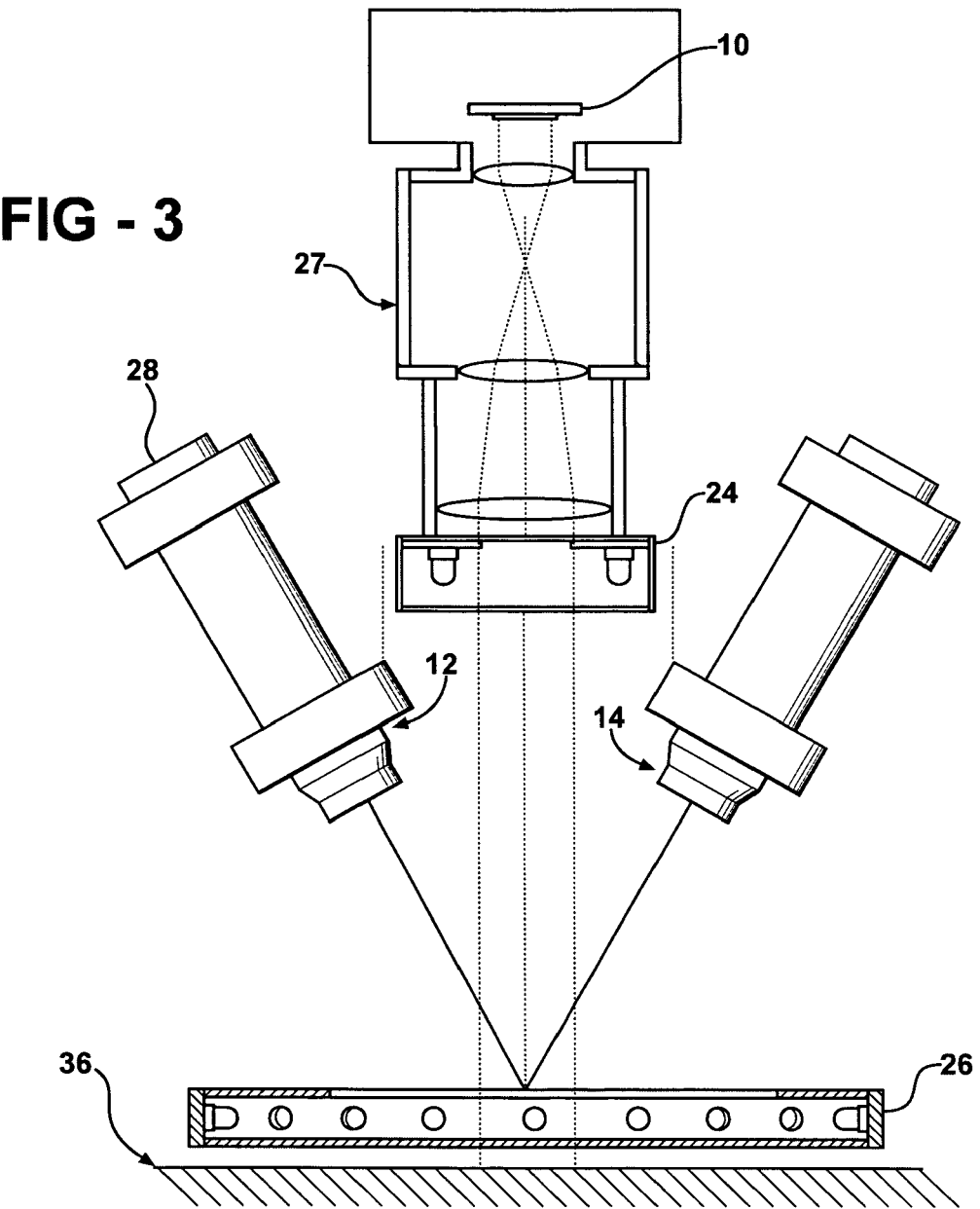
FIG. 3 is a schematic of the sensor and lighting arrangement configured to acquire two dimensional and three dimensional data characteristic of an object according to a second preferred embodiment of the present invention.

With reference to the attached figures and in particular with reference to FIG. 1 there is a schematic illustration of the first preferred embodiment of the present invention. FIG. 1 illustrates a sensor/processor 10 and a single offset laser 12. FIGS. 2 and 3 illustrate a second preferred embodiment, which uses two offset lasers.

As shown, laser 12 projects a laser line 16 over a plurality three dimensional features, in this case balls 22 on a plane in the form of a ball grid array 20. Sensor/processor 10 captures images of the laser line 16 as it is reflected from the balls 22 and processes them as will be herein described.

Figure 4:
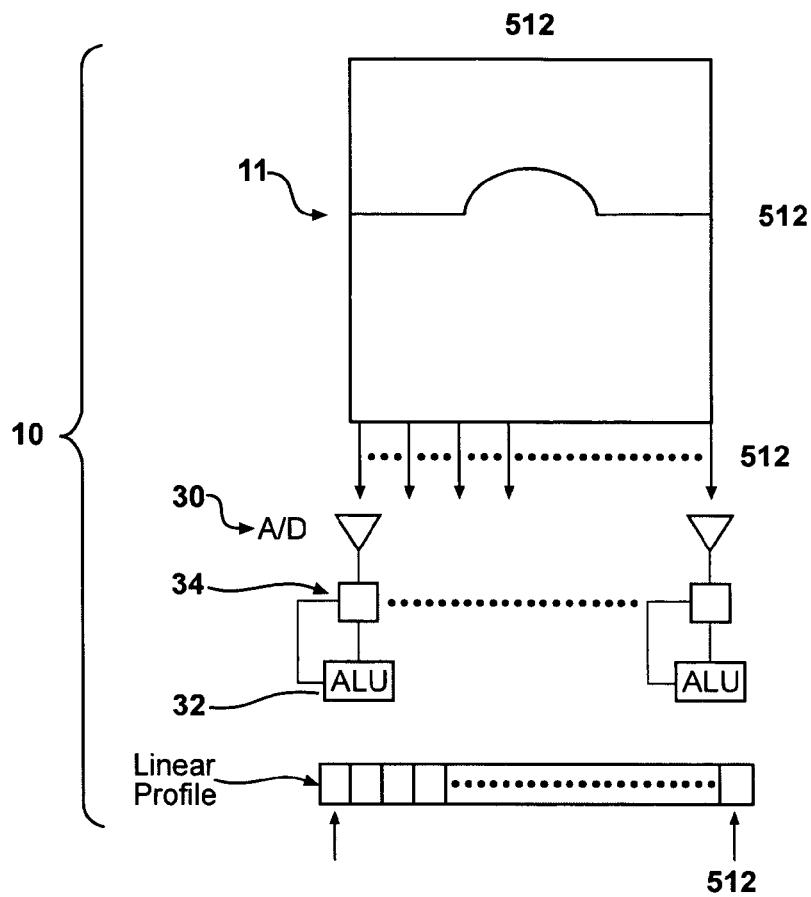
FIG. 4 is a schematic representation of a sensor/processor of the present invention including a 512×512 two-dimensional CMOS array including a plurality of A/D converters operable and reading out data from the columns in parallel and including a plurality of arithmetical project units that process the data to provide a linear profile.
Figure 5:
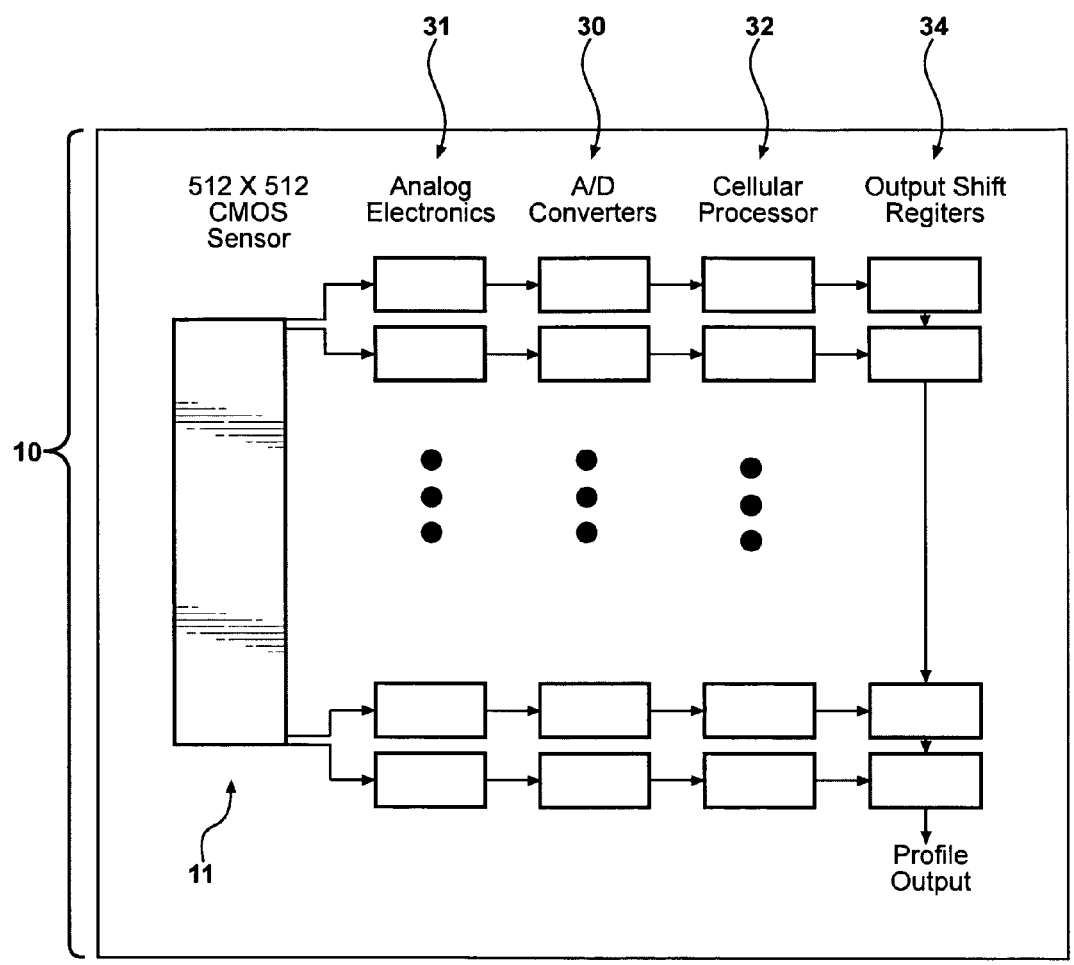
FIG. 5 is an alternate representation of FIG. 4 including a plurality of A/D converters, cellular processors, and output shift registers where the output shift registers temporarily store the linear profile.

As schematically illustrated in FIGS. 4 and 5, sensor/processor 10 includes a CMOS camera or sensor 11. CMOS camera 11 is preferably a CMOS chip containing a 512×512 two dimensional CMOS array made up of pixels arranged in rows and columns. It is understood that the sensor could also be a charged coupled device (CCD) including pixels arranged in rows and columns. The CMOS sensor is made up of a grid of pixels including 512 rows and 512 columns. Light reflected from balls 22 is captured by CMOS sensor 11, and the individual pixels are charged to a representative voltage level. As illustrated in FIG. 4 the voltage levels from each column are individually read out in parallel to 512 separate A/D converters 30. Each column is individually processed by 512 separate arithmetical logical units (ALU) 32. Those of skill in the art would recognize that alternate logical components could be used such as look-up tables or programmable array logic devices (PALs). After processing, a linear profile is derived into registers at 34.

Sensor/processor 10 is manufactured by International Vision Products (IVP) located at Linköping, Sweden. Sensor/processor 10 is described in U.S. Pat. Nos. 4,684,991 and 5,822,468, which are incorporated herein by reference. Advantageously, the IVP sensor operates at comparably high processing speeds enabling the system to utilize significantly more information than previously available for the inspection of IC packages. For example, the IVP sensor may output 3000 lines per second of 1024 bytes each.

The CMOS sensor 11 portion of FIG. 4 illustrates a single captured image including a profile of a ball 22 obstructed by noise. The plurality of ALUs determines the point within the captured image that represents the laser light line on the ball as compared to the surrounding noise. By reading out the columns of data in parallel as illustrated and described, the present invention measures data and therefore coplanarity at a much faster rate compared to the prior art. ALUs 32 each select a single value or calculate a single value representative of a point on the laser line. While many options exist, the preferred techniques generally involve smoothing the data from each column and/or thresholding that data. The ALU then chooses the maximum value. This maximum value best represents the laser line 16 reflected from the BGA 20.

FIG. 5 is an alternate illustration of a sensor/processor 10. FIG. 5 includes a 512×512 array of photosensors wherein each column includes analog electronics 31. The data are converted to digital values by the analog-to-digital (A/D) converters 30, processed by a cellular processor 32 and stored in the registers 34.

Figure 6:
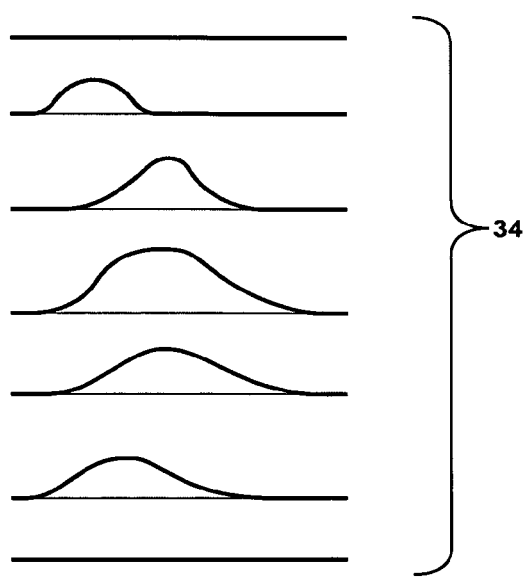
FIG. 6 is a schematic representation of a plurality of profiles captured by a camera.

FIG. 6 illustrates a collection of profiles taken at different locations on the ball grid array that would pass through registers 34.

Figure 7:
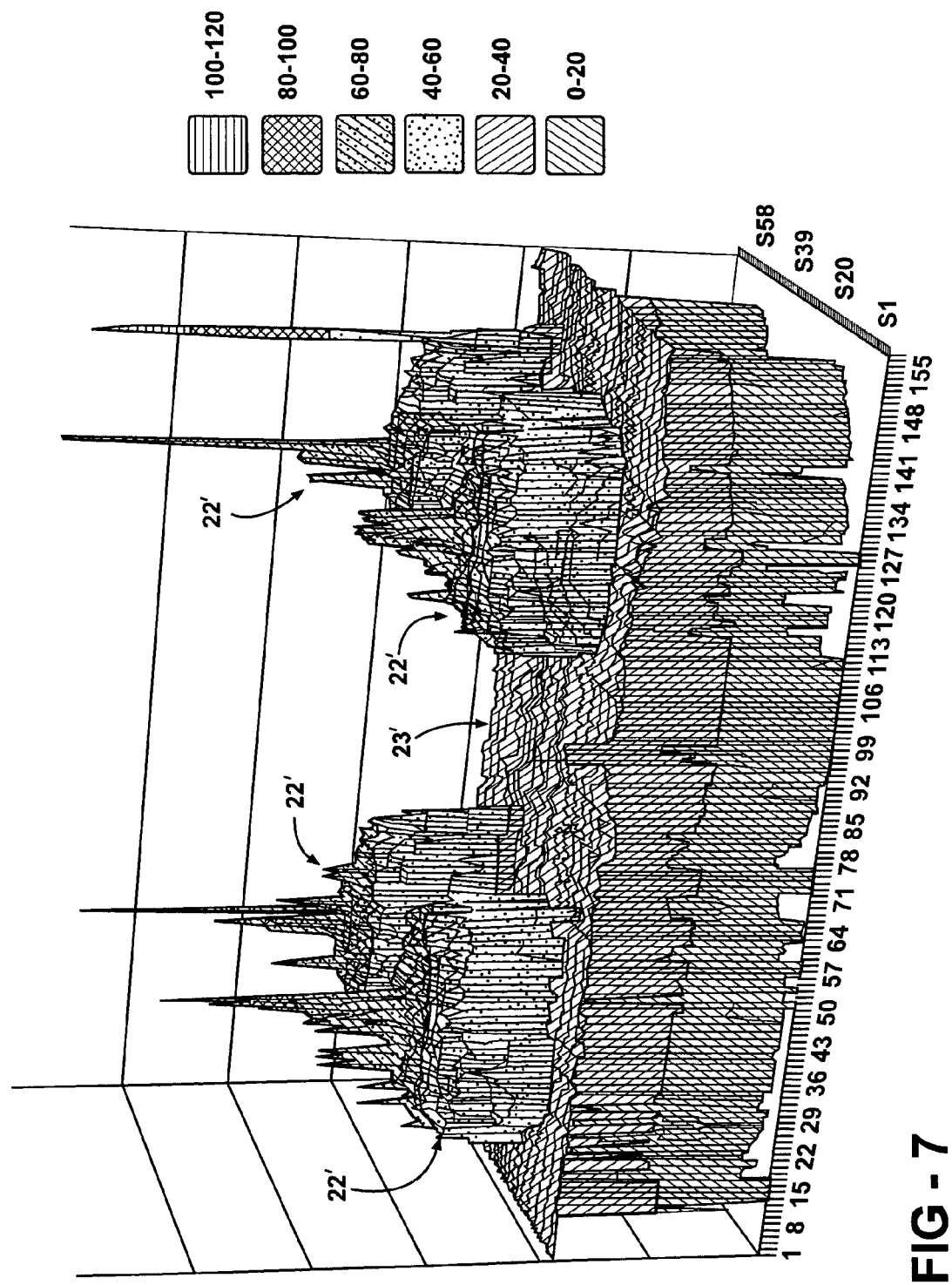
FIG. 7 is an illustration of the plurality of profiles joined together to provide a three dimensional image or three dimensional data set.
Figure 8:
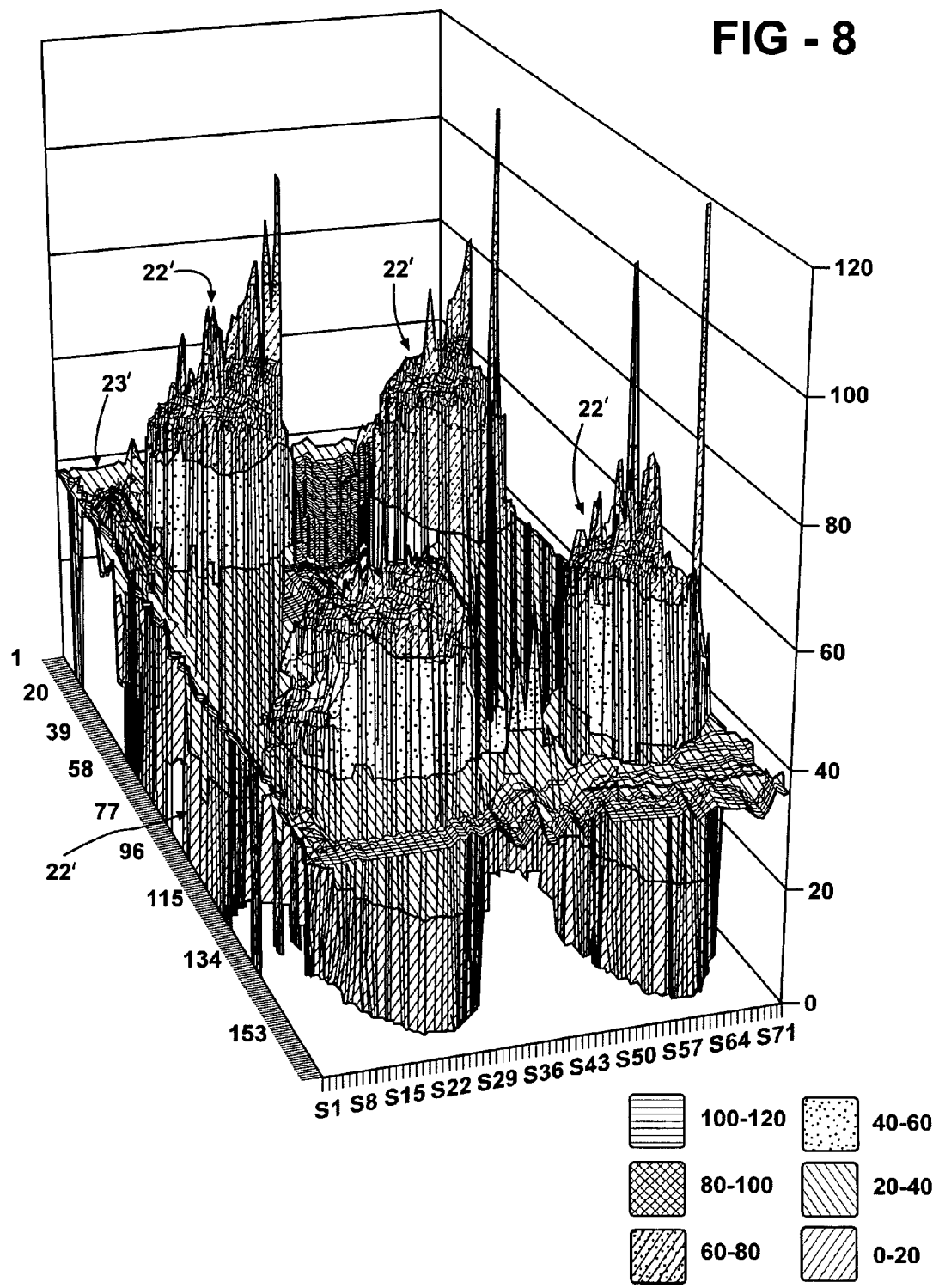
FIG. 8 is a representation of a plurality of profiles joined together.
Figure 9:
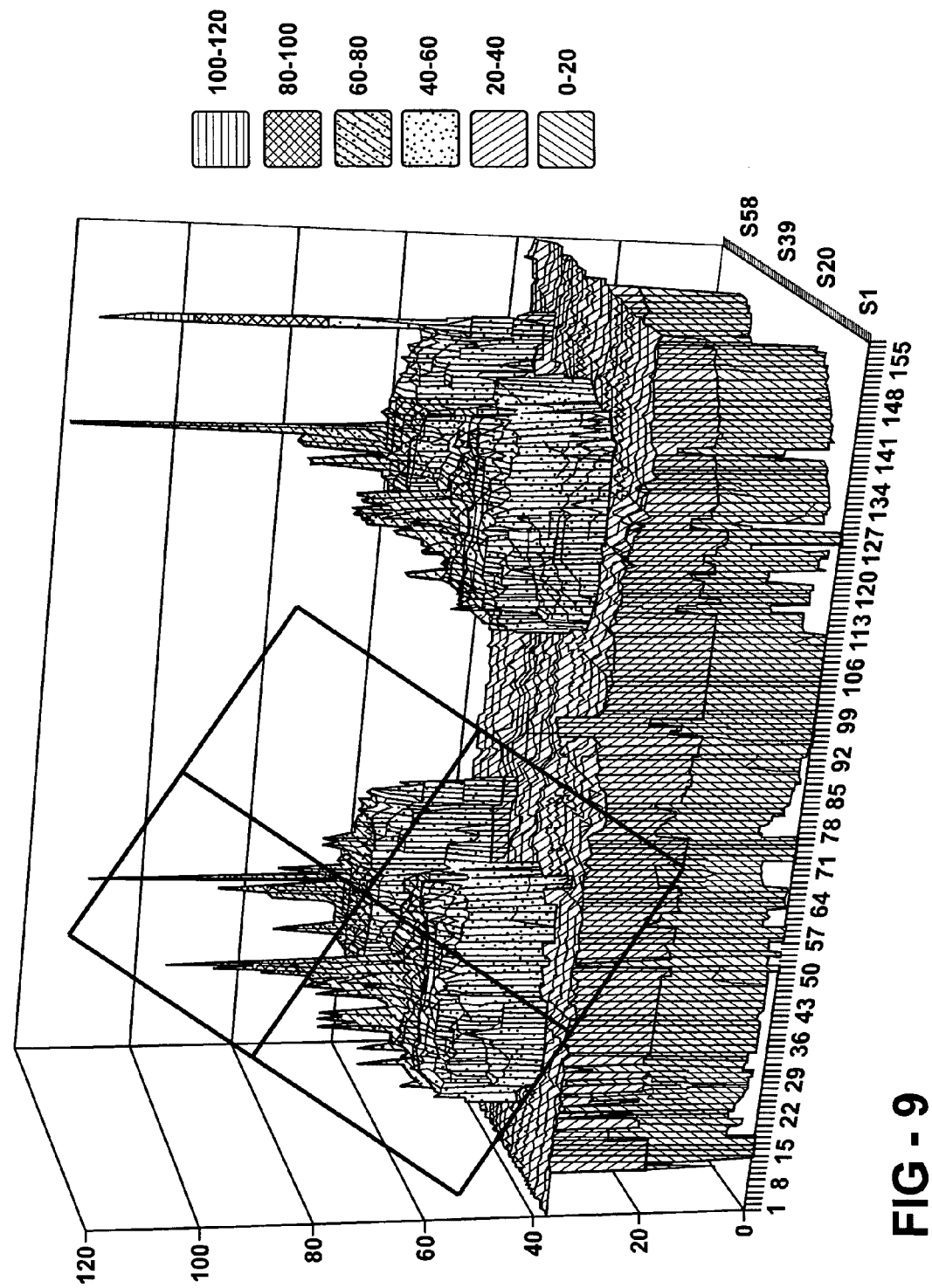
FIG. 9 is a representation of a plurality of the profiles joined together in which the coplanarity of the features is measured.

The linear profiles captured in FIG. 6 are joined together as illustrated by FIGS. 7 and 8 to provide a three dimensional representation of the three dimensional features imaged, as illustrated a ball grid array. The adjoined profiles illustrated in FIGS. 7 and 8 provide the relative height of each ball from the wafer. Each ball is illustrated as 22' and the wafer is illustrated as 23'. While FIGS. 7 and 8 illustrate only four balls, it is understood that FIGS. 7 and 8 merely represent an IC package with three dimensional features, and specifically FIGS. 7 and 8 merely represent a larger ball grid array. Once an entire ball grid array is captured in an image form, such as that illustrated in FIGS. 7 and 8, a separate processor may evaluate the image to determine whether the balls 22' are coplanar and whether the wafer 23' is planar. The balls 22' maybe evaluated for coplanarity by, for example, a least-squares method or measurement of planes of repose. The measurement for coplanarity is schematically illustrated at FIG. 9.

Further, the wafer 23' may be evaluated for coplanarity by sampling points from the wafer 23' and setting a second degree polynomial using a least-squares method.

As explained in greater detail below, once the height of each three dimensional feature, e.g. a ball or a lead, is known, the plane of repose can be calculated. The plane of repose is the plane upon which the package would rest if it were turned leads- or balls-down and set on a plane surface. Although in theory there could be an infinite number of planes of repose for a given part, for practical reasons in the preferred embodiment no more than two or three are selected. Two or three are preferred because selecting more would increase processing time significantly, and it has been found that selecting two or three is sufficient to determine whether the three dimensional features of an IC package are coplanar. Once the planes of repose have been selected, the distance of each lead or ball from the plane can be calculated and compared to a preselected limit. If any of the leads or balls exceeds the limit, the part fails, and this failure is noted. For process control purposes the mean and distribution of distance from the plane of repose may be noted.

In addition, of interest to the IC manufacturer is the flatness of the surface or wafer upon which the balls are attached. If this surface deviates from flat by greater than a preselected amount, this information is sent to the process control system, and optionally the part is rejected.

Another embodiment of a 2D/3D vision system 28 of the present invention is further illustrated in FIGS. 2 and 3. An IC package including three dimensional features is placed on surface 36 (shown in FIG. 3). As illustrated in FIG. 2, 3D features may be formed by the balls 22 of a ball grid array 20. Light from offset lasers 12 and 14 provide a 3D profile from the left of a strip, and a 3D profile from the right of laser line 16. Laser beams are reflected off each three dimensional feature 22 and captured by sensor 10. This produces an information characteristic of the height, or the Z axis, of the feature, which is termed a 3D profile as explained above. By using two lasers 12, 14, one from the right of the surface 36, and one from the left of the surface 36, two 3D profiles are obtained, a 3D left (3DL) profile and a 3D right (3DR) profile. These separate 3D profiles represent the same three dimensional features from the IC package but are captured from a different angle. In particular, the 3DL and 3DR profiles will have different "shadow" effects where the laser cannot image the entire surface of the IC package. These separate 3D profiles may be used together or separately, or may be combined to evaluate the 3D data. Examples of how the 3D data could be combined include averaging the values, selecting the greater of two values or selecting the lesser of two values. It is understood that a wide variety of ways exist to combine the values.

Figure 10:
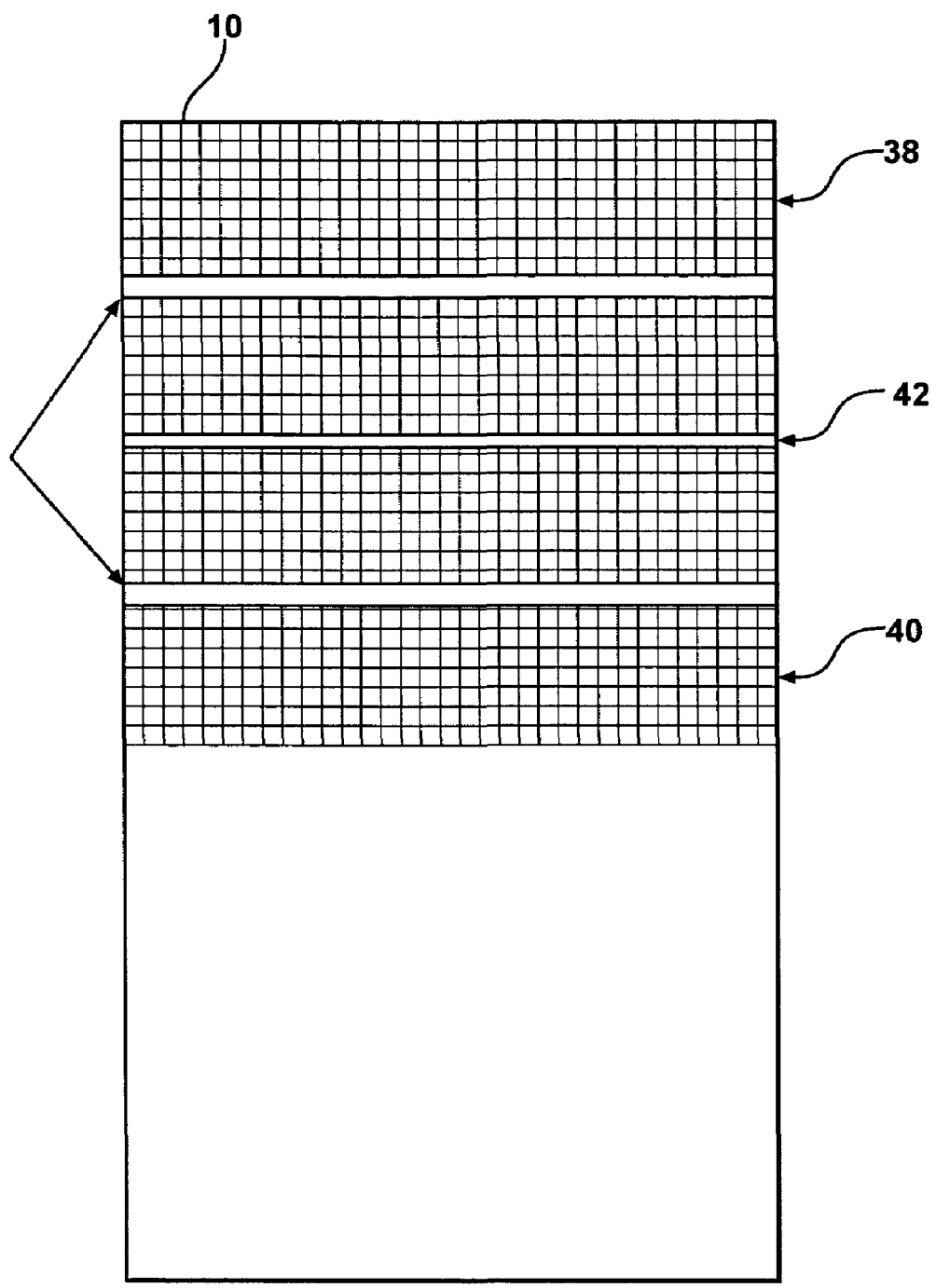
FIG. 10 is a schematic representation of the preferred configuration of the sensor according to one aspect of the invention in which the sensor is configured to capture both two dimensional data and three dimensional data.

As described above, sensor 10 provides for rapid processing of data. With reference to FIG. 10 it is shown how sensor 10 is configured to capture two separate 3D profiles from separate offset lasers 12 and 14 in addition to a distinct 2D representation of the three dimensional features on the IC package. As illustrated, sensor 10 is configured to capture both 2D and 3D images. Those portions configured to capture 3D images including 3D data are configured as described above, namely the processor associated with each column selects a single value which is then part of a profile. In the preferred embodiment, one or two columns of sensor 10 are configured to capture 2D data as shown at 42. The 2D images include data in a gray scale format representing the three dimensional features of the IC package as viewed from above. As illustrated, regions 38 and 40 of CMOS sensor 10 are configured to capture 3D data while region 42 is configured to capture 2D data. In the preferred embodiment 2D region 42 is 1 or 2 columns wide. By moving sensor 10 over surface 36, 2D images of all 3D features 22 may be captured.

FIG. 3 illustrates two different illumination devices, lasers 12 and 14 and ring lights 24 and 26. As lasers 12 and 14 illuminate the IC Package, 3D images are captured by regions 38 and 40 of sensor 10. Lasers 12, 14 are preferably thin-line lasers having a width of 10 microns and are purchased from Lasiris, located in Montreal, Canada. When the 2D grayscale measurements are made, lasers 12 and 14 are deactivated and ring lights 24 and 26 are used. Ring lights 24 and 26 include dark field and bright field illumination and illuminate the IC package appropriately to capture a 2D image. Ring lights 24 and 26 are available for purchase from Advanced Illumination in Rochester, Vt.

As shown, light reflected from the IC package from both lasers 12 and 14 and ring lights 24 and 26 is directed through a telecentric lens system 27, and the reflected light is focused on sensor 10. Telecentric lens system 27 minimizes distortion by allowing light to pass in a parallel path from the IC package to sensor 10. Telecentric lens of the type used in the preferred embodiment are available for purchase from Sill Optic in Wendelstein, Germany. In the preferred embodiment ring lights 24 and 26, which are operative in capturing 2D images, and lasers 12 and 14, which are operative in capturing 3D images, are actuated sequentially for each position of the IC package relative to system 28. System 28 is moved over IC package to acquire the 3D and 2D data described above. It is understood that for each position the sensor system is in relative to the IC package two images are captured, the 2D and 3D images. Typical operation would be as follows: lasers 12 and 14 would illuminate and sensor 10 would capture 3D data; lasers 12 and 14 would deactivate, and ring lights 24 and 26 would activate, at which time sensor 10 would acquire the 2D data; either of the sensor system or IC package would be moved; and the process would repeat until all necessary data was acquired such that 3D and 2D images could be created characteristic of the object. It is understood that alternately system 28 could capture all 3D data and then go back and capture the 2D data, or capture the 2D data first followed by the 3D data.

When inspecting IC packages having 3D features it is important that those features be coplanar. For purposes of processing the data characteristic of the 3D features it is convenient to think in terms of principal planes and axes. It is understood that the location of any feature is defined by an address, which is typically made up of an x, y, and z component. The principal axes are the x, y, and z axes, and the principal planes are the x-y, y-z, and x-z planes. Each location can be determined with respect to these principal axes and planes. In general, it is convenient to use the x-y plane as the horizontal plane for determining lead or ball locations in a 2D space and to use the z axis for determining the height of the tops, or bottoms, of the leads or balls with respect to the x-y plane; i.e., 3D space. Of course, it is well known that should the actual physical coordinates not coincide with these planes, simple transformations translating the data to use these planes and axes are available and have been incorporated for ease of use. For example, if the IC packages are processed on a slight angle, the actual positions can be rotated with respect to the principal planes, and transformation of the data to the principal planes, or rotation of the principal planes, can be performed for ease of use.

Figure 15:
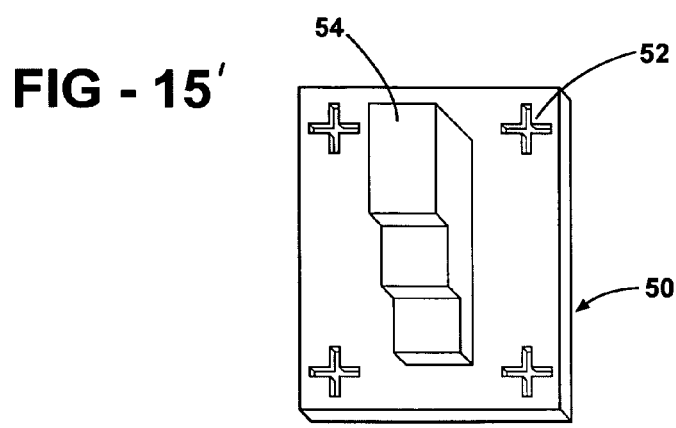
FIG. 15 is a flow chart illustration calibration of the present invention.
Figure 15:
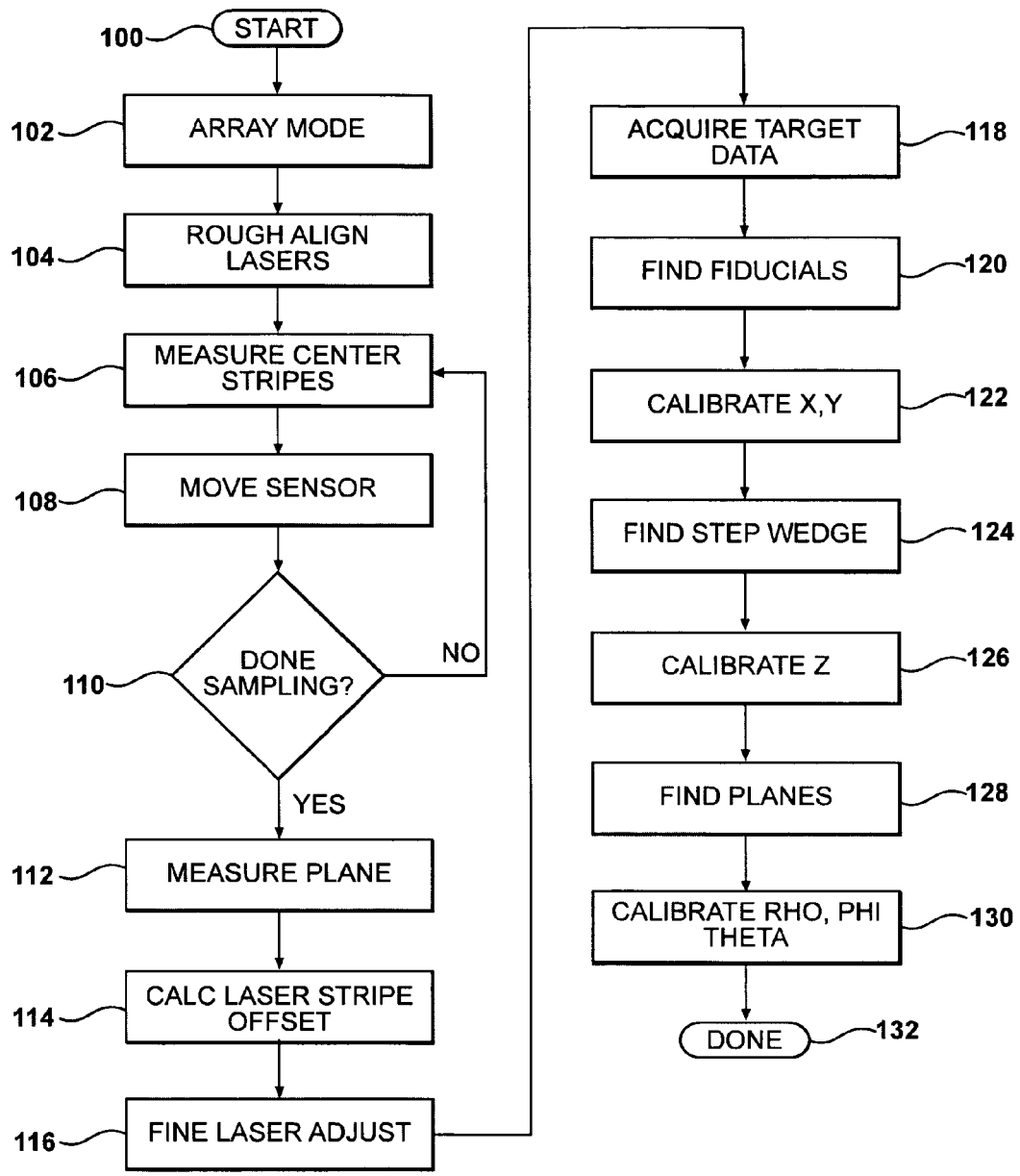

With reference to FIG. 15, a calibration is preferably performed at set up to develop the relationship between the data measurements and real-world coordinates. The calibration establishes the relationship between the three data sets, one 2D data set and two 3D data sets. The calibration provides the appropriate scaling and correction factors that arise to convert the sensor data to the real-world planar positions and heights. The calibration is performed by processing a specially machined fixture, called a "golden part" 50 illustrated in FIG. 15', which contains specifically defined survey points, or fiducial marks, and step wedges that are precision machined and measured. The golden part 50 may be of a wide variety of configurations, including a flat plane, a configuration exactly representing an ideal IC package identical to the IC package to be inspected, or a planar block with steps and inclined planes.

With reference to FIG. 15', and in the first preferred embodiment, the golden part 50 is substantially planar and includes an etched "X" mark 52 therein. The features of the golden part 50 when scanned with the sensor provide the necessary information for computing the scaling and correction factors including a transformation between 2D and 3D space as will be described in greater detail below.

As shown in FIG. 15 the process is started at 100, and sensor 10 is initialized at 102 to acquire data in array mode. The calibration could be performed in line scan mode but is typically performed more quickly in array scan mode. Array mode describes a stationary relationship between sensor 10 and golden part 50. Images are captured and read out their entirety. Line mode involves moving sensor 10 over golden part 50 and reading the data out line by line. Lasers 12 and 14 are roughly aligned at 104 by acquiring array mode images while adjusting the lasers lines to fall in the desired rows of the 2D image while the sensor to golden part distance is equal to a desired distance. The desired distance is typically a user set parameter. Aligning the lasers at this user set distance establishes a $Z_0$ plane, which is the plane that the 3D calculations reference and which should fall in the middle of the range of values to be measured to provide the greatest dynamic range for the system.

The first scans of golden part 50 are then performed. The center of each laser stripe 16 (the line of light created by the laser) from laser 12 and 14 is measured at 106 and the sensor is moved at 108. The sensor system moves to all locations. The process of measuring the center stripes is continued at 108 and 110 by moving the sensor until the sampling is done at 110. The plane of the golden part is measured at 112. Measuring the plane involves taking 3D data characteristic of the planar portion of the golden part. The offset for the measurements of the center stripes, i.e., the distance between center points for laser stripes, are calculated at 114. Following the offset calculation, there is a fine tuning adjustment in the laser alignments at 116. The purpose of fine tuning is to provide a correction table for later processing. The result of slight misalignment of the lasers is to perceive the measured object as tilted, when it may be perpendicular to the optical axis of the system. By measuring an object known to be perpendicular to the optical axis, such as golden part 50, the offsets can be measured, stored and used to determine if during actual processing lasers 12 and 14 are aligned. If not aligned, the offsets can subtracted from subsequent scans to correct for misalignment.

Following the measurements for golden part orientation and the laser alignments another scan is performed, and the data is acquired at 118 for targets on golden part 50. The data acquired from the golden part is processed and fiducials are found at 120. The fiducials are survey points, or landmarks, on golden part 50 that determine the orientation of the part, and allow for the relative determination of positions of the desired target objects. This allows for a qualitative determination of the location of the desired target objects without having to know their absolute positions, such as occurs in the case of an individual IC package positioned in a pocket of a tray wherein the IC package has shifted. The fiducials in the preferred embodiment are the lines of the etched "X" mark 52 and steps 54 on golden part 50. The 2D positions, the x and y locations, of the target data are calibrated at 122. This information is determined from the known positions of the precisely measured features of golden part 50 and is compared with the information acquired from the 2D grayscale scan of golden part 50. An alternative method is to etch the fiducial marks into the fixture that holds the part and perform the same measurements as above.

If the golden part includes step wedges (precision vertical steps on the golden tray), those step wedges are found at 124. The step wedges provide the height information for calibrating the Z data at 126, or altitudes of specified 3D features from the 3D left and 3D right laser scans. The height information may also be obtained from the depth of etching of "X" mark 52 of golden part 50. The step wedge information provides an alternate method of determining the relationship between the displacements and altitudes. The step wedge is scanned, and the relative altitudes of the steps 54 are calculated. These are compared to the actual distances between steps 54 measured by some other precision means and stored in the system. Calculating the relationship between the stored measurements and the measured values enables the sensor to be calibrated for distance along the Z axis relative to the 2D information.

An alternative method of calibrating Z distances is to use a Z-axis motion control associated with the sensor system 28 shown in FIG. 3 to move the golden part 50 through the sensor's range of measurement. Golden part 50 is moved to a position along the Z axis, and Z-motion encoders (not separately shown) are queried to establish the precision location on the Z axis for the part. Sensor 10 measures the location of the part and compares it to the actual location. This is repeated for several locations in the range of measurement of sensor 10 and the resulting relationship between measured locations and actual locations is used to calibrate the scale of Z-axis measurement.

Once the Z-axis scale has been calibrated at 126, the system finds planes at 128 and is calibrated for rho, phi and theta at 130. Rho, phi and theta describe the attitude (i.e., pitch, yaw, etc.) of the golden part 50 in space in relation to the plane defined by the X- and Y-motion axes. Either sensor 10 or golden part 50 may be moved to effect measurement of golden part 50. In this calibration at least three non-collinear points on the golden part are measured, and the plane that they describe in three-space is determined. The angles in three-space that the measured plane makes with respect to the X, Y motion of the scanning apparatus are stored as rho, phi and theta, along with the point in space selected as the center of the previously calculated $Z_0$ plane. This defines a relationship between the X, Y motion of sensor system 28 relative to the known plane of golden part 50. These three angles and one point, along with the X, Y, and Z scales previously calculated and the fine calibration data from the laser angle calibration enable any two measured 3D points in the field of view to be adjusted to provide an accurate relative distance from the sensor. The calibration process is done at 132.

Figure 11:
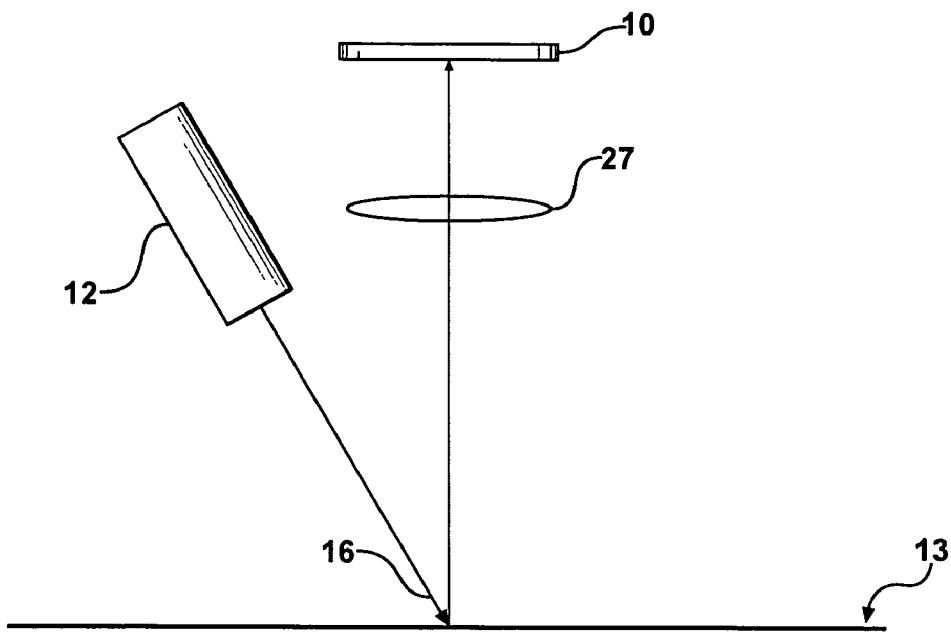
FIG. 11 illustrates a laser line reflected from an object into a sensor.
Figure 12:
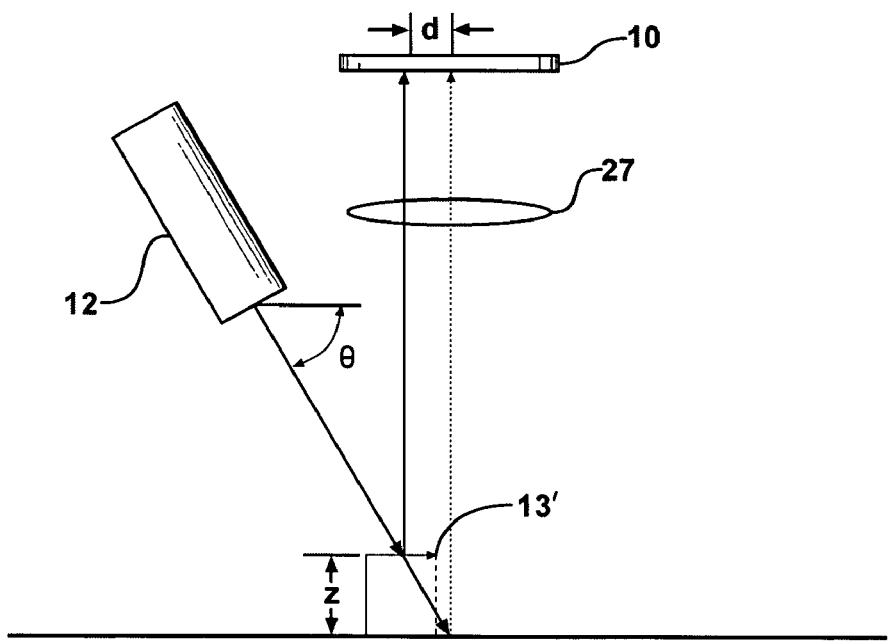
FIG. 12 illustrates problems created in the prior art because of geometric distortion.
Figure 13:
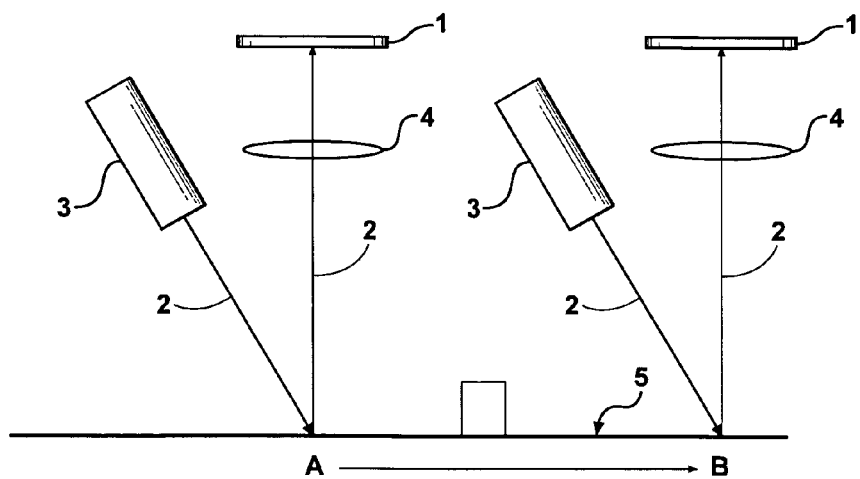
FIG. 13 indicates a scan path for a laser measuring a object including a three dimensional feature.
Figure 14:
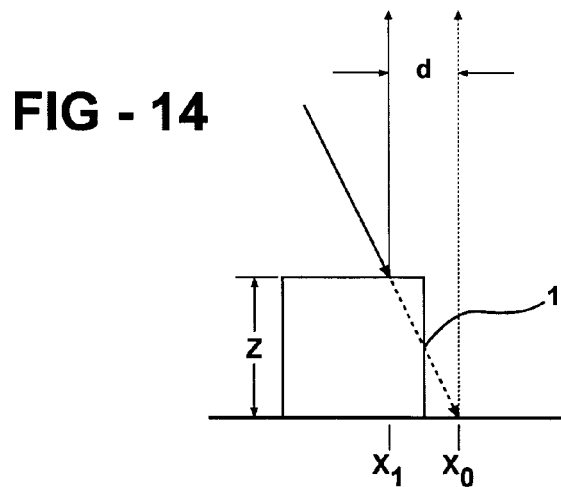
FIG. 14 illustrates problems in the prior art created by geometric distortion.

One problem associated with 3D sensors that has heretofore not been recognized by the prior art is geometric distortion. Geometric distortion is an artifact caused by the fact that the laser sensor combination is offset relative to the 3D object being scanned. This problem is illustrated in FIGS. 11–14. When acquiring 3D data with an oblique laser/sensor combination, there is some geometric distortion in the measurements by virtue of the displacement of the reflected laser beam due to the height of the object scanned. In laser/sensor imaging, a laser projects a line 16 on an object. This line is then imaged using an array type sensor arranged at an angle theta (θ) to the laser as shown in FIG. 12. Sensor 10 images a laser line 16 projected by a laser 12 or 14, reflected off the object plane 13 and through a lens system 27. As shown in FIGS. 11 and 12 if the Z displacement is zero, sensor 10 images laser line 16 from object plane 13 in the center of the sensor 10. FIG. 12 shows that a Z height causes the images to be sensed by the sensor 10 off its center. The 3D data is extracted as shown in FIG. 12 by measuring the displacement d of the laser line on the sensor 10 caused by interposing an object 13' in the path of the laser line. The displacement d is proportional to the altitude of the object Z and the angle θ between the laser and the optical axis of the sensor system. A full 3D map of an object is created by moving either the object to be studied or the sensor in a direction perpendicular to the laser stripe, acquiring data along the way as shown in FIGS. 13 and 14.

The relative altitude of a point measured with a displacement type 3D sensor is calculated from the displacement d of the reflected point from a zero plane. The displacement, d, of the reflected point from the zero plane is related to the relative altitude, Z, by the equation:

$$Z = d * \tan \theta. \quad (1)$$

As shown in FIG. 14 sensor 10 attempts to measure the altitude of the object at position $X_0$, but laser beam 16 is intercepted by the object 13' at position $X_1$ where the object 13' has an altitude Z, yielding the measured displacement of d. The measure d is proportional to the altitude of the object 13' at the point measured, and is a measure of the displacement from the actual location of the object 13'. The actual location of the point measured at $X_0$ is:

$$X_0 = X_1 - d. \quad (2)$$

The present invention provides a plurality of ways to correct geometric distortion when evaluating data in 3D space. One way is to transform the entire 3D data set according to the equations previously referenced. This has the effect of removing the geometric distortion but at the cost of processing time and sampling rate. Removing geometric distortion in this fashion re-samples the data non-linearly, potentially moving more than one pixel to the same location while leaving other pixels empty as can be seen when trying to measure position $X_0$. In addition, noise or other spurious signals can be combined into the data in undesirable and unpredictable ways. The advantage of this method is that calculation of the templates to be used to find the features in 3D space is straightforward.

Another method for processing 3D data is to use the raw data uncorrected for geometric distortion and process it with similarly distorted models or templates. In this method, the feature used as a template is distorted in the same fashion as the data. Standard methods for locating patterns in images are then employed, such as normalized correlation, to locate the pattern with high precision. Once the pattern is located, it can be measured using a variety of methods to determine its altitude, and once the altitude is known, the planes of repose and distances may be calculated. Here, two choices exist for formation of the distorted template. In the first, a synthetic or idealized model of the feature, described by known mathematical equations can be created and then subjected to the same types of geometric distortion as the data is subjected to by the sensor. The second is to acquire several examples of the feature to be used to create the template and use a combination of the acquired examples to create the template. This has the advantage of including in the template higher order geometric distortions that are more difficult to describe mathematically and model, but that show up in the data. The disadvantage is that this method tends to include noise and other sources of spurious data. Combining several different scans of similar features is used to reduce the effect of spurious data.

The third method of processing data and the preferred method is to acquire both 2D and 3D data of the same part. The 2D and 3D data are preferably acquired simultaneously in the invention described herein, but this is not required. In this method, the 2D data is processed to locate the 3D features in question to a high degree of accuracy. This information is then used to guide the location of the 3D features in the 3D data sets. The transformation between 3D data space and 2D data space is provided from the golden part calibration. An advantage of this method is that the part can be pre-checked in 2D space and if the part fails the 2D processing, i.e. the wrong number of features is found, or the features are found at the wrong location, processing can be stopped without performing 3D calculations, since presumably the part will be rejected based on the 2D processing. The expected altitude of the 3D feature is required by this method, since the geometric distortion is a function of altitude. Since the type of part being inspected is known, the expected altitude of the feature can be derived from a priori knowledge of the part geometry, or from data acquired at the time the template was formed if it was formed from actual scans of the part. Once the 2D location of the part is known and the expected offset of the part from the $Z_O$ plane is known, the 3D feature can be roughly located. The exact location of the feature in 3D may differ slightly from the expected location due to small variations in the altitude of a given feature. If the feature location differs significantly from the expected location, the part is defective and should presumably be rejected.

Once the feature is located in 3D space with the assistance of 2D data, two preferred choices exist for processing. In the first, the area of the 3D image data containing the 3D feature can be transformed to remove the geometric distortion and the data processed as if it were undistorted. This has all of the advantages and disadvantages mentioned above, except that since a much smaller amount of data is being transformed the speed disadvantage is not as great. In the second, a transformed template, or one derived from scanned data, is used on the untransformed data to measure the feature directly.

The present invention may use templates of the 3D feature to determine the location and height of the 3D feature. 3D data may be processed to determine the location of the 3D features to be measured without reference to the 2D data. Prior to processing the scanned data from the IC package to be measured, a representative IC package is scanned under user control. The user manually selects features to be measured and directs the system to construct templates for each type of feature to measure. A template is a mathematical representation in this case, an average 3D feature. These templates are stored for later use during runtime measurement.

Figure 16:
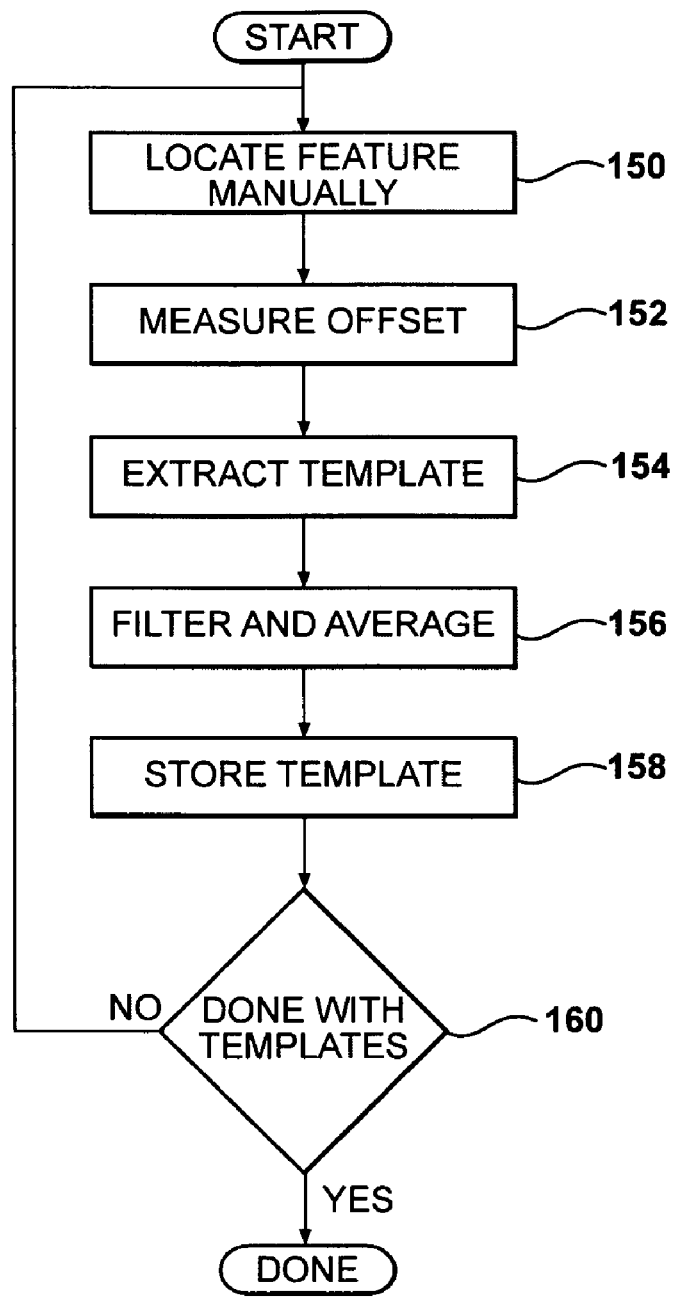
FIG. 16 is a flow chart in which templates are created.

FIG. 16 shows a flow diagram of the preferred template formation process. At step 150, the user selects the area to be used as a template by interacting with a graphical user interface (GUI) which enables the user to view 3D image data and select a region to be made into a template. In step 152 the selected area is measured to locate the center of the feature within the field of view and to locate any similar features in the field of view. This is coined measuring the offset. These features are extracted in step 154 and filtered and combined into one average feature in step 156. This average feature is stored in step 158 for use at runtime. This process is repeated until all features to be found at runtime have been processed as indicated at 160. It is understood that the processing of FIG. 16 provides a template characteristic of an average feature. As described above the system may also use a "synthetic" template.

Using a template of an average feature to find similar features at runtime has the advantage of filtering out artifact and noise that may be present in a single example of the feature as scanned by the sensor described herein. The alternative to using actual scanned data to construct a template is to use a synthetic representation to form the template as above described. For example, if the radius of the sphere to be found is known beforehand, a sphere can be formed synthetically to use as the template to find other spheres. A difficulty with this approach is that the sphere as scanned by the sensor described herein would have systematic distortions and artifacts caused by the geometry of the laser stripe interacting with the geometry of the part as describe above (geometric distortion). This will cause a sphere to appear non-spherical when scanned. Thus, in order to be used as a template, either the data to be processed has to be transformed to remove geometric distortions, the synthetic template has to be distorted to match the scan distortions, or an actual scanned feature can be used to form the template. All three of these methods may be used in the present invention, depending upon the accuracy and speed requirements of a given measurement.

With reference to FIG. 17 there is shown the process by which 3D data is acquired and evaluated for coplanarity. The scans are started at 200, and the 2D and 3D images are acquired by sensor 10 at 202. The images are acquired when sensor module 28 passes over the IC package. As described above the sensor acquires left and right side 3D images and 2D images. The 3D images output from sensor 10 are in the form of a profile as shown in FIG. 4, while the 2D images are in gray scale.

The 2D images are used as a first pass to preliminarily identify and find defects to efficiently reject an IC package with defects in the positioning of the 3D features before processing for coplanarity occurs. This is an early step in finding and discarding defective packages. The 2D images are first pre-processed at 204. Preprocessing of 2D images typically involves filtering the images with a linear low-pass type filter to remove noise, such as 2D convolution with a Gaussian curve. As a part of the sorting and ordering of data within an image, the data is marked according to the respective IC package to which it belongs. The 2D image is processed to find data characteristic of all features at 206, i.e. balls, leads, edges, and corners of a package. The finding and measurement is performed by first training an algorithm using a selected representative feature from the part to be measured. In the case of a BGA, the user would locate a single ball in the acquired data. The algorithm then takes this representative feature and uses it to train a normalized correlation routine (NCR) to recognize this feature. The NCR algorithm processes the 2D image and finds all the trained features. As is known, the found features that exceed a predetermined score are accepted as being true features. The positions of the three dimensional features in 2D space are determined, and the positions of edges, corners and other landmarks on the IC packages are determined.

The two dimensional data characteristic of the features are sorted and assigned to groups at 208 of leads according to their position with respect to a given landmark. The groups of found 3D features in 2D space are checked for correctness at 210, where each group of 3D features in 2D space has a specified number and location. The first pass on determining if an IC package is bad is made at this point. Any IC package with missing 3D features in 2D space, or with one or more 3D features in 2D space outside of predetermined tolerances for their respective positions is determined to be a defective IC package and is identified to be rejected and discarded at 212, and further processing of the data for a rejected package is discontinued at 214. This is an early removal on the checking of IC packages that prevents further processing of the IC packages determined to be defective. A defective IC package as determined from its 2D data does not need to have its 3D data checked, saving processing time by preventing the analysis of these defective IC packages.

As is shown at 216 the 2D measurements of the 3D features are recorded. It is understood that these recorded measurements may be reported to the user or may be used for functions unrelated to the evaluation of 3D data.

Once it is determined that the number and type of features is correct, the rough location of the features can be passed to the 3D processing routines to guide location of the 3D features in 3D space. The methods of locating the data characteristics of 3D features as found in the 3D data set may be of many types. For example, in the preferred embodiment, the 2D/3D transformation derived from the golden part calibration. It is also understood that the 3D features in the 3D data set may be located using either of the templates above-described or a prior knowledge an the geometric distortion equations.

As shown in FIG. 17, 3D data is simultaneously pre-processed when the 2D data is pre-processed. Pre-processing of the 3D data occurs at 220. The pre-processing of the 3D data is preferably done in parallel with the 2D data processing and measurements, and then the 3D data is held until needed for further processing. The pre-processing of 3D data involves smoothing and filling in the 3D data for further evaluation. This type of pre-processing is preferably performed using order-statistic filtering, such as a median filter. In addition, the data is filtered using non-linear filters that take advantage of the known geometry of the parts. In particular, the highest expected value in altitude is known from the engineering description of the part. In the same fashion, the lowest altitude expected on the part is known to a reasonable degree of accuracy. Thus, if any process results in an apparent measurement being taken that exceeds either extreme in altitude, it can be removed without changing the measurement to be taken, since it can be assumed to be spurious. In the case of data where the value is greater than 110% of the predicted value of the height, or top, of the ball, or lead, the data is removed. In addition, any data that is below the level of the substrate by more than 10% of the substrate's predicted height (z value), or has a height that is less than 90% of the expected height of the substrate, is removed. Spurious data arises from voids found in the substrate, and from apparent heights resulting from the laser beam reflecting off a more distant target as the scan passes over the top of a given target. Removal is important to prevent an abnormal weighting resulting from an abnormally large value, i.e., an unexpectedly large altitude or depth.

The 3D features are located at 230. The process of locating the 3D features in the 3D data set in the preferred embodiment utilizes the 2D/3D transform acquired from the golden part calibration and thus precisely locates that 3D data actually representing the 3D features. It is understood that other techniques may be used to locate the 3D features. Precise location of the feature in 3D space involves determining the altitude of the parts. One way of doing this uses the template of the part as discussed above and fits the template to the feature data in a least-squares sense. The difference between the template and the data is minimized. Since the altitude of the template is known, the adjustment in Z required to minimize the difference between the template, and the data is the difference between the template altitude and the altitude of the feature under test. The feature can also be measured by using an arbitrary geometric shape. Many of the features to be measured are simple planes, therefore fitting a plane to the data in the least-squares sense will provide the required data. Fitting a plane gives the altitude of the feature with respect to a given point in space and also yields information on the attitude of the feature, both of which are useful information. Sub-pixel resolution is possible using the above-described template technique.

When many samples are available to fit a shape to a feature, the location can be determined to less than a single pixel. Statistically, if the uncertainty of a single measurement is S, and the number of additional measurements is N, the certainty with which the measurement can be made increases as $S/(\sqrt{N})$.

The measurements of the Z values are precisely determined and are used to find the planes of repose for the leads or balls at 234. These are planes that rest upon the tops of all the leads. Although in theory there are a very large number of planes of repose, for practical reasons no more than two or three are selected. Planes of repose are calculated by ranking the measured 3D features from the tallest to the shortest. Beginning with the tallest features first, the highest three values are selected. These are fit to a plane using well-known calculations. The plane is checked, and if it falls within a few degrees of the substrate plane, it is retained. Typically, plus or minus ten degrees is used. The second-tallest feature is discarded, and the fourth tallest feature added to the remaining two features. A plane fit as before. This plane is compared to the previous plane, if one was selected, and to the substrate. If the plane is within a few degrees of the substrate and is different from the previously selected plane, it is retained. This method continues until the selected number of planes of repose is calculated. As stated, the selected number is preferably one to three. The distance of all of the features from the planes is then checked. If a plane exists from which no feature's distance exceeds a pre-selected tolerance, the part passes. If no plane of repose is found that is closer than a pre-selected distance from all of the features, the features are determined to be non-coplanar, and the maximum value is reported 260. The measure to be used to measure the distance of the features from the plane can either be a Euclidean distance, where the distance of the feature is measured perpendicular to the plane, or a simple distance where the distance along the Z axis is used. The advantage of using the Euclidean distance is that it is more accurate, but it is more time-consuming to calculate. The advantage of using a simple distance measure is ease of computation at the expense of accuracy. The method chosen will depend upon the desired accuracy of the process.

It is understood that the template which can be used to determine the height of the 3D feature can also be used to evaluate each 3D feature. In addition to comparing the heights of the leads, the shape of each 3D feature, each feature is checked to look for any significant defects, i.e., in the case of BGAs the quality of each ball can be assessed. When there is a significant deviation from the shape of the template by an individual lead, the lead has been formed incorrectly, such as in the case of BGAs where insufficient solder would leave a ball with a void space. The IC package would then be rejected. The defect can be defined in terms of shape and position. If the position of the defect is on the top of the ball, the height from a plane of repose could be sufficient to reject the IC package, or if the defect is sufficiently large, the IC package could be rejected for insufficient solder to affix the IC package to a substrate.

In addition to checking for coplanarity of the leads, and checking the quality of the leads, this invention can check on warpage of the IC package. Warpage of the IC package is the amount of deviation from a planar shape of the package. Points on the IC package to be measured for warpage are included as features to be measured in the setup procedure. These are either flat planes, as described above, or are corners of the package, which would be measured by forming a template just as with other features. These feature measurements are combined in a special way once they are measured. The measured points are combined, and a plane is fit to all of the points. If the distance of any substrate points exceed a predetermined tolerance, the package has an unsatisfactory curvature to it, and it is labeled to be rejected.

The use of two lasers provides the advantage of revealing 3D data that might be obscured from view of one laser. For example, a sphere, when illuminated by one laser at an angle and viewed from above by the sensor would only be able to acquire data from one side and the top of the sphere. By illuminating the sphere from the opposite direction more of the sphere can be imaged. The question is what to do with two data sets taken from the same feature. If the data sets are transformed to remove geometric distortion prior to processing, the data sets can be combined in a non-linear arithmetic fashion. This method is described as non-linear because if a part of the data has been determined to be spurious as described above, it is not used in the combination. If both corresponding data points have been determined to be valid, they can be averaged. If the data sets are to be processed without having geometric distortion removed, they have to be processed separately. If the measurements are determined to be valid, as indicated by an adequate measure of quality on the least-squares fit, then the resulting measures can be averaged.

It is understood that a wide variety of hardware could be used to carry out the methods described above. Namely, the system could save some of an image or pipeline an image through its processor.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for evaluating the quality of an IC package where the IC package includes a plurality of three dimensional features, the method comprising:
    acquiring a two dimensional image characteristic of a portion of the IC package, the two dimensional image defined by a plurality of pixels having at least an address and a pixel intensity;
    acquiring a three dimensional image characteristic of the portion of the IC package, the three dimensional image defined by a plurality of pixels having at least an address and an altitude;
    processing the two dimensional image to identify a plurality of addresses which are characteristic of three dimensional features;
    processing the three dimensional image only at those addresses which correspond to two dimensional addresses characteristic of three dimensional features, to determine the altitude of those three dimensional features, and;
    rejecting the IC package if the altitude of the three dimensional features fall outside predetermined boundaries.

2. A method as in claim 1 wherein the processing of the three dimensional image further comprises determining the shape of the three dimensional features and the IC package is rejected if the shape of the three dimensional feature falls outside a predetermined boundary.

3. A method as in claim 2 wherein the three dimensional features are characteristic of spheres.

4. A method as in claim 3 wherein the determining step further comprises the step of comparing the spheres against at least one template.

5. A method as in claim 2 wherein the IC package is rejected if any three dimensional feature exceeds a predetermined value.

6. A method as in claim 2 wherein the IC package is rejected if the coplanarity value of a collection of three dimensional features is greater than a predetermined value.

7. A method as in claim 6 where the coplanarity value is determined by calculating planes of repose.

8. A method as in claim 6 where the coplanarity value is determined by calculating a best fit plane using least squares.

9. A method as in claim 1 further comprising comparing the two dimensional image against a two dimensional template and rejecting the quality of the IC package if the comparison reveals that the two dimensional image does not include three dimensional features in an expected configuration.

10. A method as in claim 9 wherein the two dimensional image is a gray scale image and the two dimensional image is correlated against the two dimensional template.

11. A method as in claim 1 wherein a pair of opposed lasers are used to obtain a first and second the dimensional image and the first and second three dimensional images are combined to obtain the three dimensional image.

12. A method as in claim 1 further comprising determining a correspondence between the addresses in the two dimensional image and the addresses in the three dimensional image by calibrating to a machined fixture.

13. A method as in claim 12 further comprising transforming the three dimensional image to remove geometric distortion.

14. A method for evaluating the quality of an IC package where the IC package includes a plurality of three dimensional features, the method comprising:
    acquiring a two dimensional image characteristic of a portion of the IC package, the two dimensional image defined by a plurality of pixels having at least an address and a pixel intensity;
    acquiring a three dimensional image characteristic of the portion of the IC package, the three dimensional image defined by a plurality of pixels having at least an address and an altitude;
    comparing the two dimensional image against a two dimensional template and rejecting the quality of the IC package if the comparison reveals that the two dimensional image does not include three dimensional features in an expected configuration;
    processing the two dimensional image to identify a plurality of addresses which are characteristic of three dimensional features;
    processing the three dimensional image only at those addresses which correspond to two dimensional addresses characteristic of three dimensional features, to determine the altitude of those three dimensional features, and;
    rejecting the IC package if the altitude of the three dimensional features fall outside predetermined boundaries.

15. A method as in claim 14 wherein the IC package is rejected if any three dimensional feature exceeds a predetermined value.

16. A method as in claim 14 wherein the IC package is rejected if the coplanarity value of a collection of three dimensional features is greater that a predetermined value.

17. A method as in claim 14 wherein a pair of opposed lasers are used to obtain a first and second three dimensional image and the first and second three dimensional images are combined to obtain the three dimensional image.

18. A method as in claim 14 further comprising determining a correspondence between the addresses in the two dimensional image and the addresses in the three dimensional image by calibrating to a machined fixture.

19. A method as in claim 18 further comprising transforming the three dimensional image to remove geometric distortion.

20. A method for evaluating the quality of an IC package where the IC package includes a plurality of three dimensional features, the method comprising:
  acquiring a two dimensional image characteristic of a portion of the IC package, the two dimensional image defined by a plurality of pixels having at least an address and a pixel intensity;
  acquiring a three dimensional image characteristic of the portion of the IC package, the three dimensional image defined by a plurality of pixels having at least an address and an altitude;
  processing the two dimensional image to identify a plurality of addresses which are characteristic three dimensional features;
  determining a correspondence between the addresses in the two dimensional image and the addresses in the three dimensional image by calibrating to a machined fixture;
  processing the three dimensional image only at those addresses which correspond to two dimensional addresses characteristic of three dimensional features, to determine the altitude of those three dimensional features, and;
  rejecting the IC package if the altitude of the three dimensional features fall outside predetermined boundaries.

21. A method as in claim 20 wherein the processing of the three dimensional image further comprises determining the shape of the three dimensional features and the IC package is rejected if the shape of the three dimensional feature falls outside a predetermined boundary.

22. A method as in claim 21 further comprising comparing the two dimensional image against a two dimensional template and rejecting the quality of the IC package if the comparison reveals that the two dimensional image does not include three dimensional features in an expected configuration.

23. A method as in claim 22 wherein the two dimensional image is a gray scale image and the two dimensional image is correlated against the two dimensional template.

24. A method as in claim 23 wherein a pair of opposed lasers are used to obtain a first and second three dimensional image and the first and second three dimensional images are combined to obtain the three dimensional image.

25. A method as in claim 24 further comprising transforming the three dimensional image to remove geometric distortion.

\* \* \* \* \*